(12) United States Patent
Hwang et al.

(10) Patent No.: US 8,011,623 B2
(45) Date of Patent: Sep. 6, 2011

(54) MONITOR APPARATUS

(75) Inventors: Kwang-sung Hwang, Suwon-si (KR); Dong-woo Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1009 days.

(21) Appl. No.: 11/711,763

(22) Filed: Feb. 28, 2007

(65) Prior Publication Data
US 2007/0200931 A1    Aug. 30, 2007

(30) Foreign Application Priority Data

Feb. 28, 2006 (KR) .................. 10-2006-0019490
Dec. 29, 2006 (KR) .................. 10-2006-0137820

(51) Int. Cl.
*F16M 11/38* (2006.01)
(52) U.S. Cl. ............ 248/166; 248/176.1; 248/917; 248/919; 248/923
(58) Field of Classification Search .......... 248/917–923, 248/166, 439, 173; 361/679.01
See application file for complete search history.

(56) References Cited

U.S. PATENT DOCUMENTS

| | | | |
|---|---|---|---|
| 7,289,315 B2 | 10/2007 | Hillman et al. | |
| 7,652,873 B2 * | 1/2010 | Lee | 361/679.06 |
| 7,911,784 B2 * | 3/2011 | Jones | 361/679.55 |
| 2005/0247832 A1 * | 11/2005 | Cho et al. | 248/133 |
| 2006/0000956 A1 | 1/2006 | Cvek | |
| 2006/0082518 A1 * | 4/2006 | Ram | 345/1.1 |

FOREIGN PATENT DOCUMENTS

| | | |
|---|---|---|
| EP | 1312851 | 5/2003 |
| EP | 1628190 | 2/2006 |
| KR | 10-2004-0028113 | 4/2004 |
| KR | 10-2004-0032278 | 4/2004 |
| KR | 20-0392505 | 8/2005 |
| KR | 10-2005-0107285 | 11/2005 |

OTHER PUBLICATIONS

European Search Report dated Jul. 6, 2009 in European Patent Application No. 07102606.6.

Chinese Office Action dated May 20, 2011, issued in corresponding Chinese Patent Application No. 200710092330.8.

* cited by examiner

*Primary Examiner* — Amy J. Sterling
(74) *Attorney, Agent, or Firm* — Staas & Halsey LLP

(57) ABSTRACT

A monitor apparatus, includes a monitor main body in which an image is formed; an upper link rotationally coupled to the monitor main body; a lower link rotationally coupled to the upper link; and a base including a link accommodating part to which the lower link is rotationally coupled and which accommodates the upper link and the lower link in a folded state.

18 Claims, 15 Drawing Sheets

MONITOR APPARATUS

CROSS-REFERENCE TO RELATED APPLICATIONS

This application claims the benefit of Korean Patent Application No. 2006-0019490, filed on Feb. 28, 2006 and Korean Patent Application No. 2006-0137820, filed on Dec. 29, 2006 in the Korean Intellectual Property Office, the disclosures of which are incorporated herein by reference.

BACKGROUND OF THE INVENTION

1. Field of the Invention

The present invention relates to a monitor apparatus, and more particularly, to a monitor apparatus having an improved monitor stand configuration.

2. Description of the Related Art

In general, a monitor apparatus includes a monitor main body on which an image is formed, a base supporting the monitor main body, and a link for rotating the monitor main body or adjusting the height of the monitor main body.

A conventional monitor apparatus is disclosed in Korean Patent Application No. 10-2002-59208. This monitor apparatus includes a lower link rotationally connected with a base hinge provided in a base, an upper link rotationally connected with a monitor hinge provided in a monitor main body, a link hinge provided between the upper link and the lower link to rotate the upper link with respect to the lower link in a predetermined angle, and a first auxiliary link transmitting the rotation of the lower link with respect to the base to the rotation of the upper link. Accordingly, the monitor main body can be tilted upward and downward, and the height thereof can be adjusted when tilted.

However, this monitor apparatus has a problem. The monitor apparatus's packaging volume becomes large because the upper link and the lower link between the monitor main body and the base requires a large amount of space (large volume) when the main body is folded with respect to the base member and the upper link and the lower link are folded with respect to each other.

Further, the conventional monitor apparatus has a problem in that a connection cable and a connection connector to connect an exterior device and the monitor main body are exposed to the outside so that they occupy a predetermined volume and thus cause the height of the base to be variable. Also, the connection cable and the connection connector make an outer appearance of the monitor apparatus complicated.

SUMMARY OF THE INVENTION

Aspects, features, and/or advantages of the invention will be set forth in part in the description which follows and, in part, will be apparent from the description, or may be learned by practice of the invention.

In an aspect of the present invention, there is provided a monitor apparatus having an improved configuration of an upper link and a lower link in order to minimize packaging volume of the monitor apparatus.

Further, in another aspect of the present invention, there is provided a monitor apparatus having an improved accommodating structure to accommodate a connection cable and a connection connector of an exterior device.

In an aspect of the present invention, there is provided a monitor apparatus, including a monitor main body; an upper link rotationally coupled to the monitor main body; a lower link rotationally coupled to the upper link; and a base including a link accommodating part to which the lower link is rotationally coupled and which accommodates the upper link and the lower link in a folded state.

According to another aspect of the present invention, there is provided a monitor main body and an upper link, which are rotationally coupled to each other along a monitor hinge axial line in parallel with a link axial line.

According another aspect of the present invention, there is provided an upper link and a lower link, which are disposed in the same planar surface in a folded state.

According to another aspect of the present invention, there is provided a base including a power supplying button for supplying a monitor main body with power.

According to another aspect of the present invention, there is provided a base including a power supplying port to which an exterior power supplying connector is coupled.

According to another aspect of the present invention, there is provided a base including a power supplying button which is connected to the power supplying port through a power supplying cable and permits power to be supplied to the monitor main body.

According to another aspect of the present invention, there is provided a monitor apparatus including a power supplying cable connecting a power supplying port and a power supplying button.

According to another aspect of the present invention, there is provided a base including a light emitting part provided on an outer circumference of a power supplying button and emitting light if power is supplied.

According to another aspect of the present invention, there is provided a light emitting part including at least one LED (light emitting diode).

According to another aspect of the present invention, there is provided a base including a video signal connector coupling part coupled to a video signal connector of an exterior device.

According to another aspect of the present invention, there is provided a base including a video signal connector coupling part adapted for coupling to a video signal connector of an exterior device to transmit a video signal from the exterior device to the monitor main body through a video signal cable coupled to the video signal connector coupling part.

According to another aspect of the present invention, there is provided a base including a video signal connector accommodating part formed from the bottom surface of the base to accommodate the video signal connector of an exterior device.

According to another aspect of the present invention, there is provided a base including a cable guide groove which is extended from a video signal connector accommodating part to an outer circumference of a bottom surface and which accommodates the video signal cable of an exterior device.

According to another aspect of the present invention, there is provided a base including a video signal connector accommodating part which is recessed on a bottom of the base to accommodate a video signal connector of an exterior device for coupling the video signal connector to a video signal connector coupling part.

According to another aspect of the present invention, there is provided a base including a cable guide groove which is extended from the video signal connector accommodating part to an end of the base to accommodate an external cable of the exterior device.

According to another aspect of the present invention, there is provided a base including a video signal cable transmitting a video signal transmitted from a video signal connector to a monitor main body.

According to another aspect of the present invention, there is provided a lower link including a lower cable guide guiding a video signal cable to an upper link.

According to another aspect of the present invention, there is provided an upper link including an upper cable guide guiding a video signal cable guided from a lower link to a monitor main body.

According to another aspect of the present invention, there is provided a monitor apparatus including a main body cable guide which is formed through a coupled area of an upper link and a monitor main body and which guides a video signal cable to the monitor main body.

According to another aspect of the present invention, there is provided a base including an exterior device connector to which an exterior device is connected.

According to another aspect of the present invention, there is provided a base including a control button controlling a display state of a monitor main body.

According to another aspect of the present invention, there is provided an upper link and a lower link in the folded state having the same height as the base.

According to another aspect of the present invention, there is provided an upper link and a lower link in the folded state having a height which is less than the height of the base.

According to another aspect of the present invention, there is provided a monitor apparatus stand for supporting a monitor main body, including an upper link rotationally coupled to a monitor main body; a lower link rotationally coupled to an upper link; and a base having a link accommodating part in which the upper link and the lower link are accommodated.

According to another aspect of the present invention, there is provided a monitor apparatus including an upper link adapted to be rotationally coupled to a monitor main body; a lower link rotationally coupled to the upper link; and a base comprising a link accommodating part in which the upper link and the lower link are accommodated.

According to another aspect of the present invention, there is provided an upper link and a lower link, which are provided to be adjacent to each other and share a rotating axis.

According to another aspect of the present invention, there is provided a rotating axis including a first middle hinge axis to enable an upper link to rotate with respect to a monitor main body, and a second middle hinge axis to enable a lower link to rotate with respect to the upper link.

According to another aspect of the present invention, there is provided a rotating axis including a first middle hinge axis to enable the upper link and the monitor main body to rotate.

According to another aspect of the present invention, there is provided a rotating axis including a second middle hinge axis to enable the lower link and the upper link to rotate.

According to another aspect of the present invention, a link accommodating part has a shape corresponding to shapes of an upper link and a lower link and is formed with an opening area which accommodates the upper link and the lower link.

According to another aspect of the present invention, a monitor apparatus stand includes a middle hinge which is provided between an upper link and a lower link to enable the upper link and the lower link to rotate; and a base hinge which is provided between the base and the lower link to enable the lower link to rotate, wherein rotating axes of the middle hinge and the base hinge are provided to be parallel.

According to another aspect of the present invention, there is provided an upper link, which is folded in a base in parallel with a middle hinge, and there is provided a lower link, which is folded in the base in parallel with the base hinge.

According to aspect of the present invention, there is provided a monitor apparatus stand including an auxiliary link which transmits a rotation of a base hinge to a rotation of a middle hinge.

According to another aspect of the present invention, there is provided an auxiliary link in the lower link.

According to another aspect of the present invention, there is provided a monitor supporting apparatus including a supporting member coupled to a monitor main body and capable of adjusting at least one of a tilting angle and a height of the monitor main body; and a base rotationally coupled to the supporting member, wherein the base comprises a connector accommodating part recessed on a bottom thereof and formed with an external device connector to which an external device is connected.

A monitor supporting apparatus including an upper link adapted to be rotationally coupled to a monitor main body and including an upper cable guide adapted to receive a cable; a main cable guide adapted to guide the cable from the upper cable guide to the monitor main body; a base coupled to the lower link; a lower link rotationally coupled to the upper link and including a lower link cable guide adapted to guide the cable from the upper link to the base, wherein the base includes a link accommodating part in which the upper link and the lower link are accommodated.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION OF THE PREFERRED EMBODIMENTS

Figure 1:
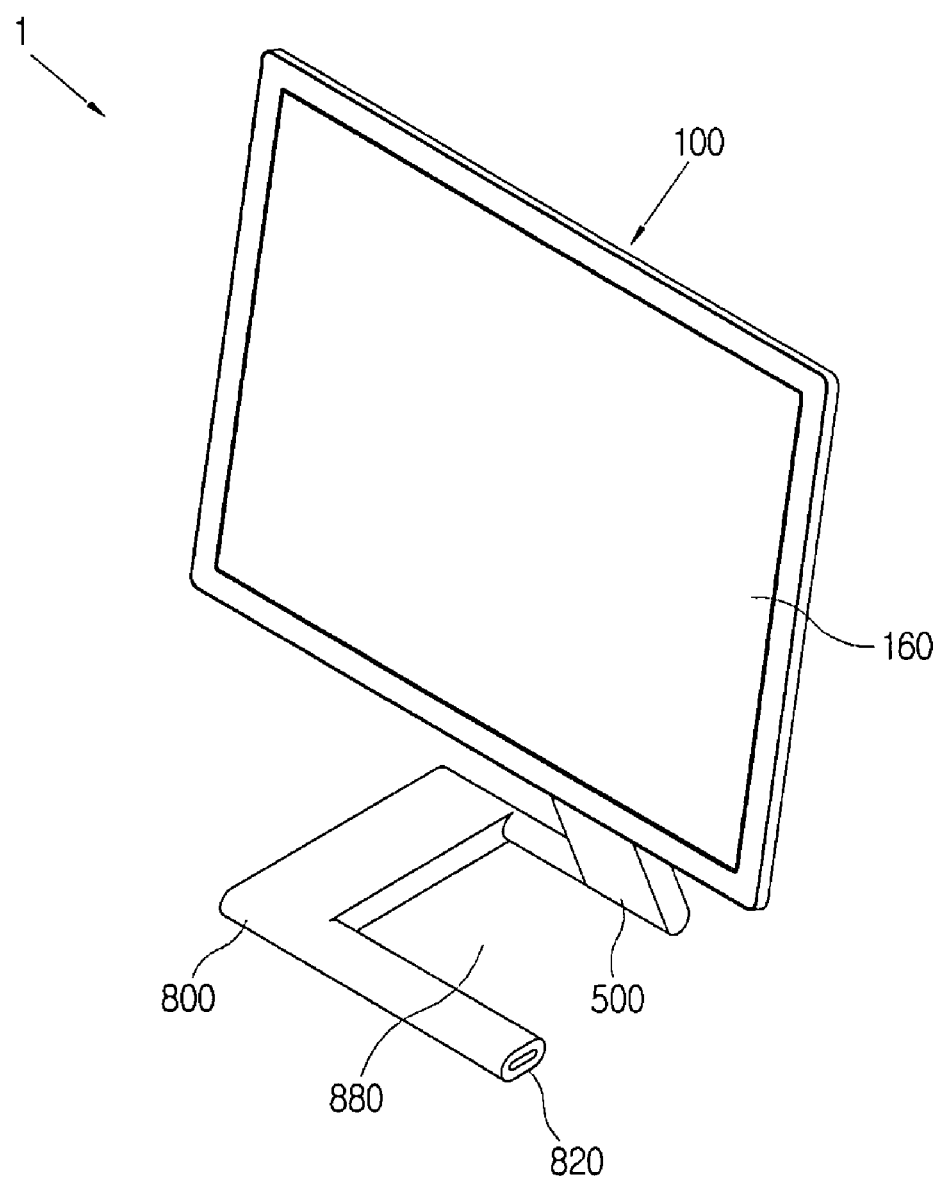
FIG. 1 is a perspective view of a monitor apparatus according to an exemplary embodiment of the present invention.

Reference will now be made in detail to exemplary embodiments of the present invention, examples of which are illustrated in the accompanying drawings, wherein like reference numerals refer to like elements throughout. Exemplary embodiments are described below so as to explain the present invention by referring to the figures.

The same elements are given the same reference numerals in various exemplary embodiments, and the same elements given the same reference numeral will be typically described in a first exemplary embodiment, and this description will therefore be omitted in other exemplary embodiments.

As shown in FIGS. 1 to 4, the monitor apparatus 1 according to an exemplary embodiment of the present invention includes a monitor main body 100 on which an image is formed, an upper link 300 connected to the monitor main body 100 and capable of rotating with respect to the monitor main body 100, a monitor hinge 200 provided between the monitor main body 100 and the upper link 300 to enable the upper link 300 to rotate with respect to the monitor main body 100 along a monitor hinge axial line, a lower link 500 having one end part connected with an end part of the upper link 300 along a predetermined link axial line, being asymmetrical with respect to the monitor main body 100, and relatively rotating between a folded state and a standing state with respect to the link axial line, a first middle hinge 400 and a second middle hinge 450 provided to connect the upper link 300 with the lower link 500 and enable the lower link 500 to tilt with respect to the upper link 300, a base 800 comprising a link accommodating part 880 for accommodating the upper link 300 and the lower link 500 in the folded state, and a base hinge 700 provided between the lower link 500 and the base 800 to enable the lower link 500 to rotate with respect to the base 800.

Also, the monitor apparatus 1 according to an exemplary embodiment of the present invention includes an auxiliary link 600 transmitting the rotation of the lower link 500 with respect to the base 800 to the upper link 300.

The monitor main body 100 is desirable to use a thin plate-shaped display panel such as a LCD (liquid crystal display) or a PDP (plasma display panel). The monitor main body 100 is provided with a display part 160 on the front part thereof, and a pivoting unit 101 for pivoting the monitor main body 100 on the back side thereof and a monitor bracket 130 tilting with respect to the monitor hinge 200.

The pivoting unit 101 which is provided between the monitor main body 100 and the monitor hinge 200 pivotally supports the monitor main body 100 so that the monitor main body 100 can rotate with respect to the monitor bracket 130 centering on a rotating axial line perpendicular to the planar surface of the display part 160. The pivoting unit 101 includes a main body bracket 110 coupled to a bracket coupling part 150 of the monitor main body 100, a pivoting bracket 120 connected to the main body bracket 110, and a plurality of disk springs 111 and 122 provided therebetween to generate a friction force.

One side of the main body bracket 110 is connected with the bracket coupling part 150 of a back side of the monitor main body 100, and on the opposite side is provided a pivoting shaft 110a (FIG. 4) to be projected backward. The pivoting bracket 120 includes a pivoting shaft accommodating part 120a provided to be connected with the pivoting shaft 110a, and a monitor bracket coupling part (not shown) coupling with the monitor bracket 130.

The monitor hinge 200 couples the monitor main body 100 to the upper link 300 so that the monitor main body 100 can rotationally tilt upward and downward with respect to the upper link 300. The monitor hinge 200 includes a round-shaped monitor shaft 210 which is inserted through the monitor bracket 130 and monitor shaft supporting parts 320a and 320b, and a clip spring 220 which accommodates the monitor shaft 210 inside and is inserted into the monitor axis supporting part 320a to supply a friction force capable of resisting the rotation of the monitor shaft 210.

The clip spring 220 inside which the monitor shaft 210 is press-fitted is inserted into the monitor shaft supporting part 320a and has the shape of a plate spring 220a coupled to a groove 321 formed in the monitor shaft supporting part 320a on one side. Hence, the clip spring 220 is integrally connected with the upper link 300, and the monitor shaft 210 accommodated inside the clip spring 220 also has a predetermined friction force to rotate. Here, the friction force is desirable to be provided bigger than a downward rotational force by the weight of the monitor main body 100.

The upper link 300 which is provided with a rectangular plate shape, monitor shaft supporting parts 320a and 320b which are tiltingly-connected with the monitor main body 100, and a lower part 340 which is coupled to a rotating shaft 623 of the first middle hinge 400. The upper link 300 is folded when the lower link 500 is folded and accommodated in the link accommodating part 880 of the base 800. The upper link 300 includes an upper link main body 310, the monitor shaft supporting parts 320a and 320b which are provided in the upper part of the upper link body 310 and accommodate and rotationally couple the monitor shaft 210 of the monitor hinge 200, the first middle hinge shaft supporting part 340 accommodating and rotationally couple the first middle hinge shaft 623, and a pair of upper link cover members 351 and 353 covering the upper link body 310.

Figure 4:
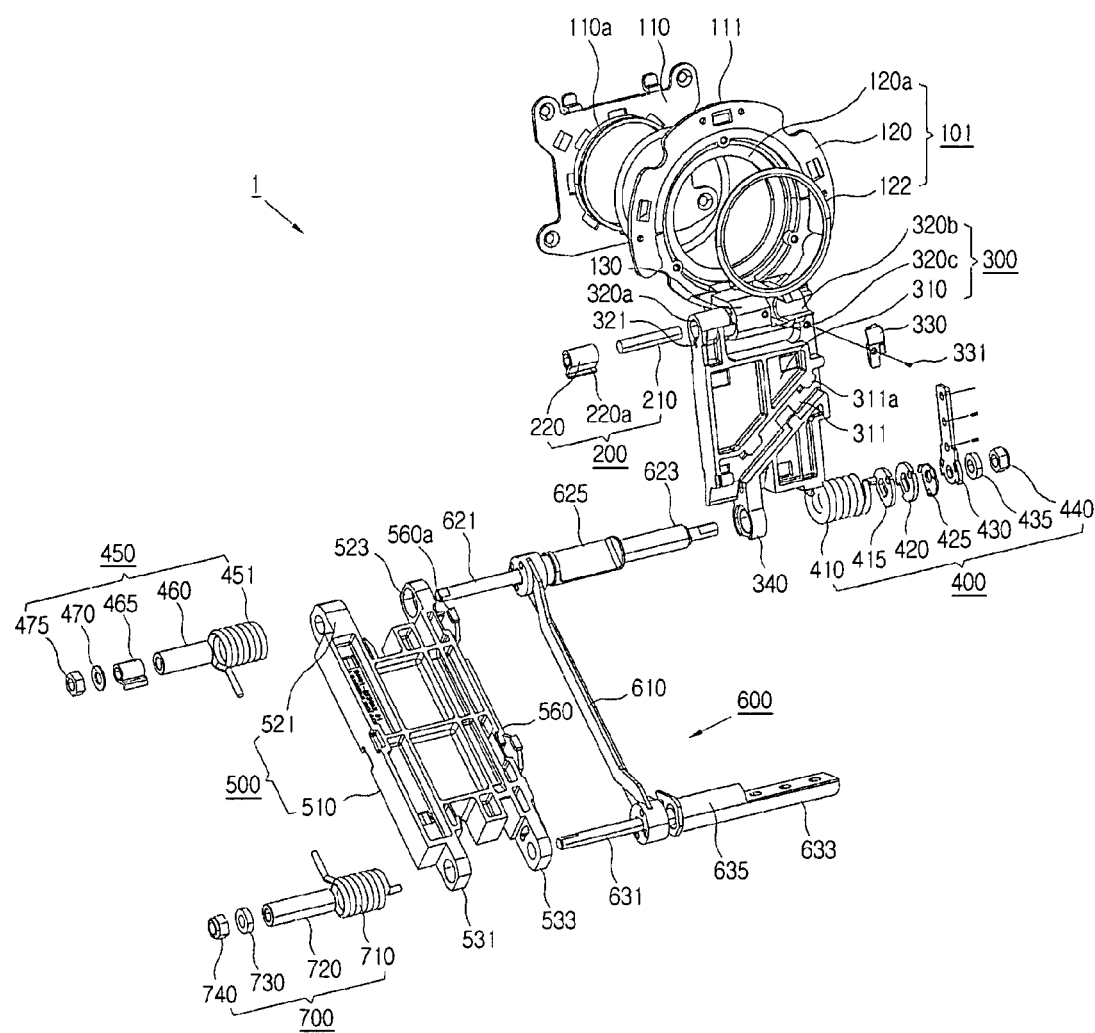
FIG. 4 is an exploded perspective view of the elements in FIG. 3.
Figure 5A:
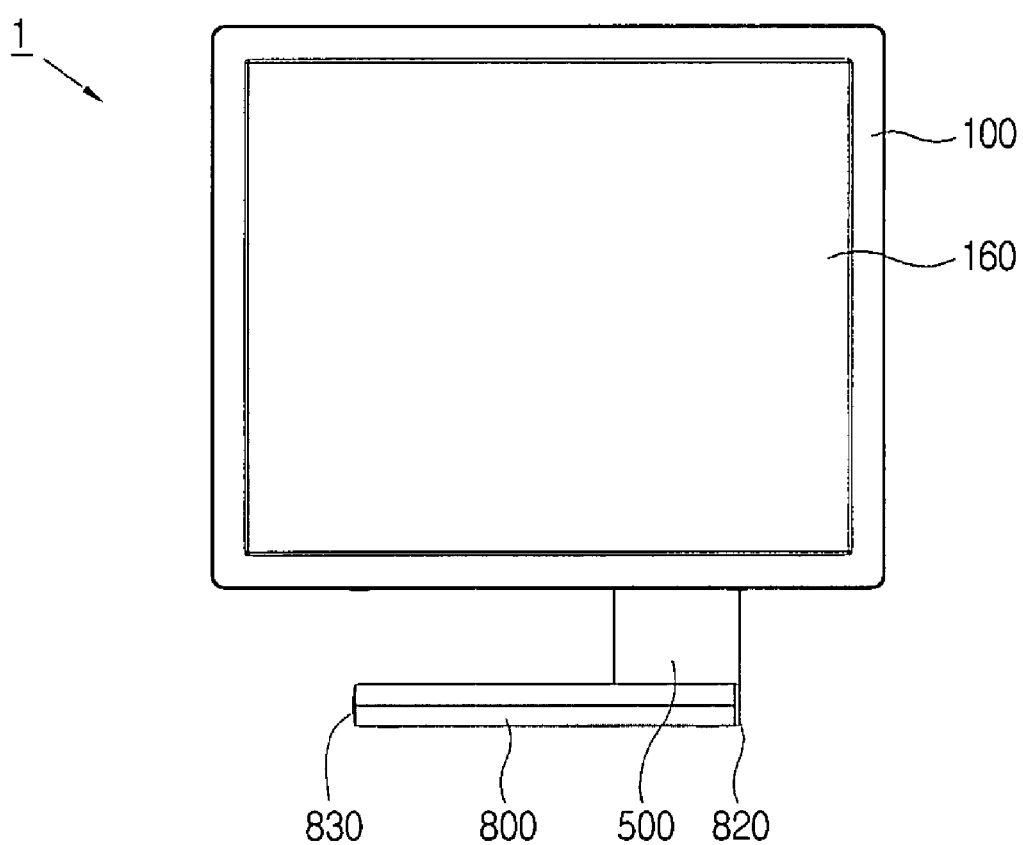
FIGS. 5A to 5E are a front view, a rear view, a left-sided view, a right-sided view and a plane view of a monitor apparatus according to an exemplary embodiment of the present invention.
Figure 5B:
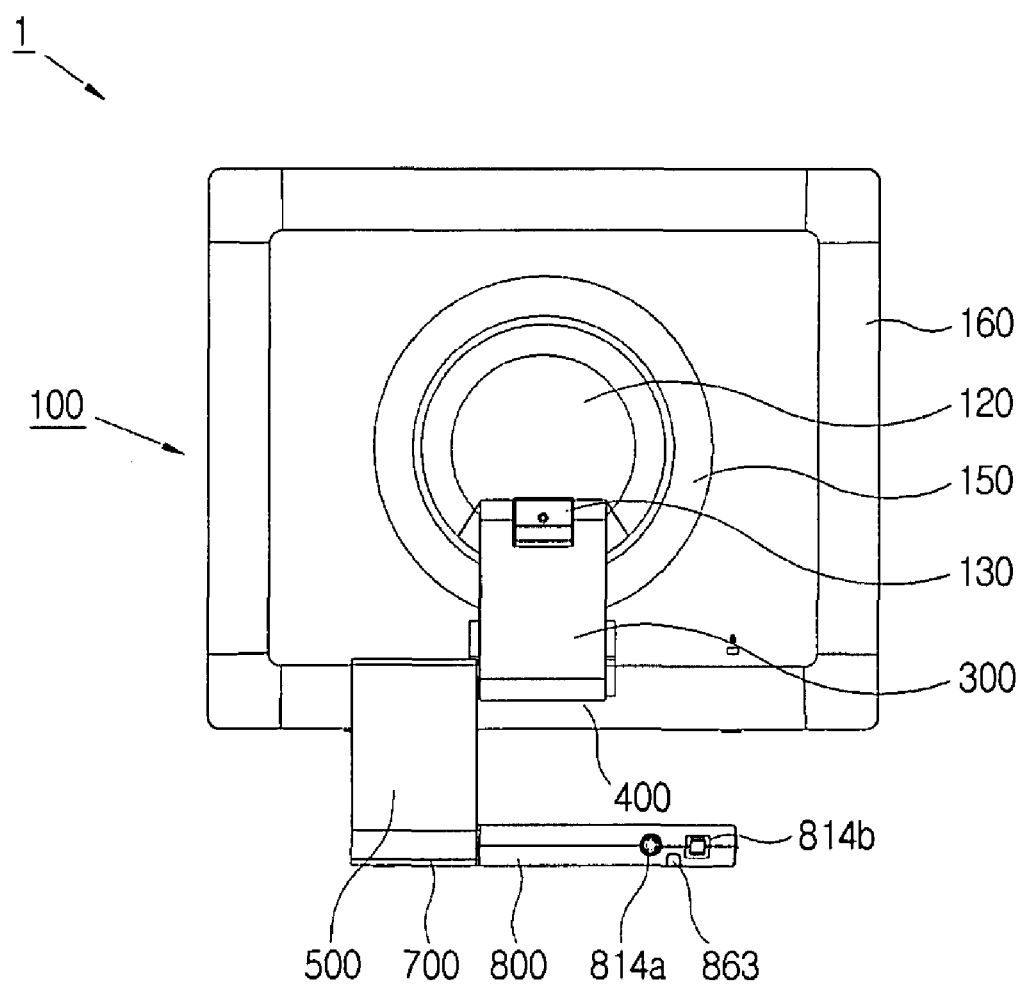
Figure 5C:
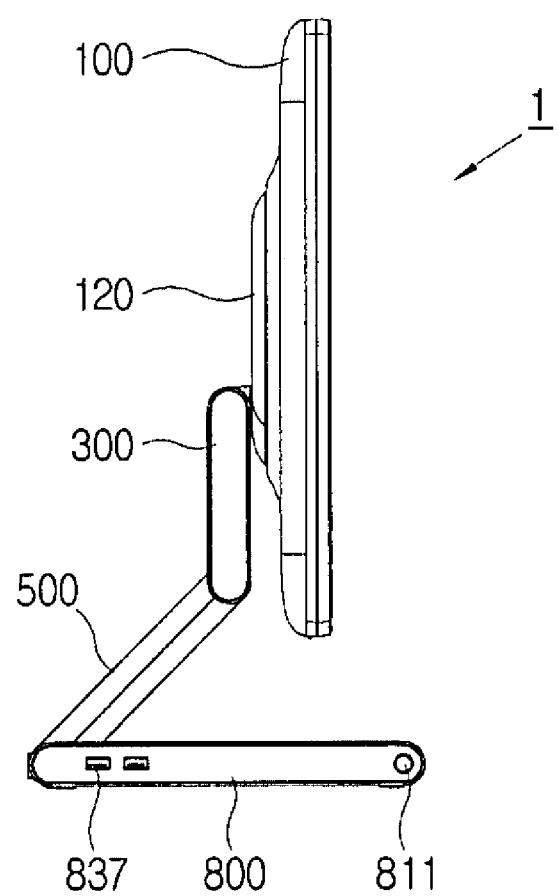
Figure 5D:
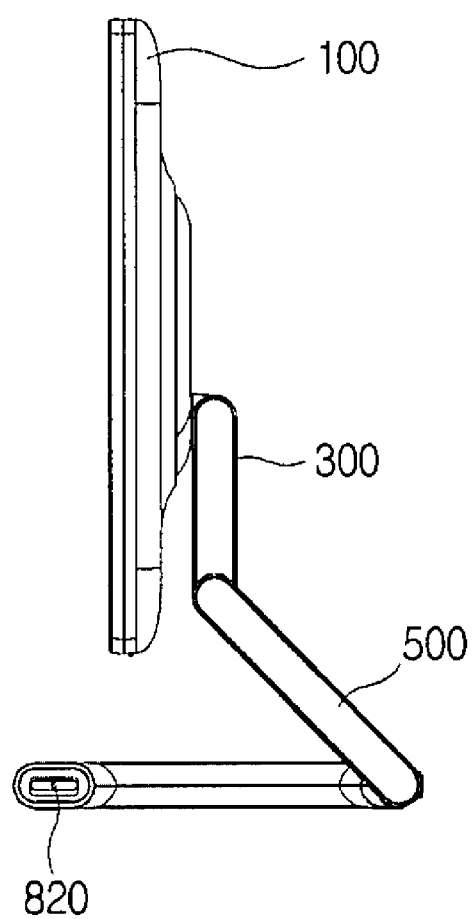
Figure 5E:
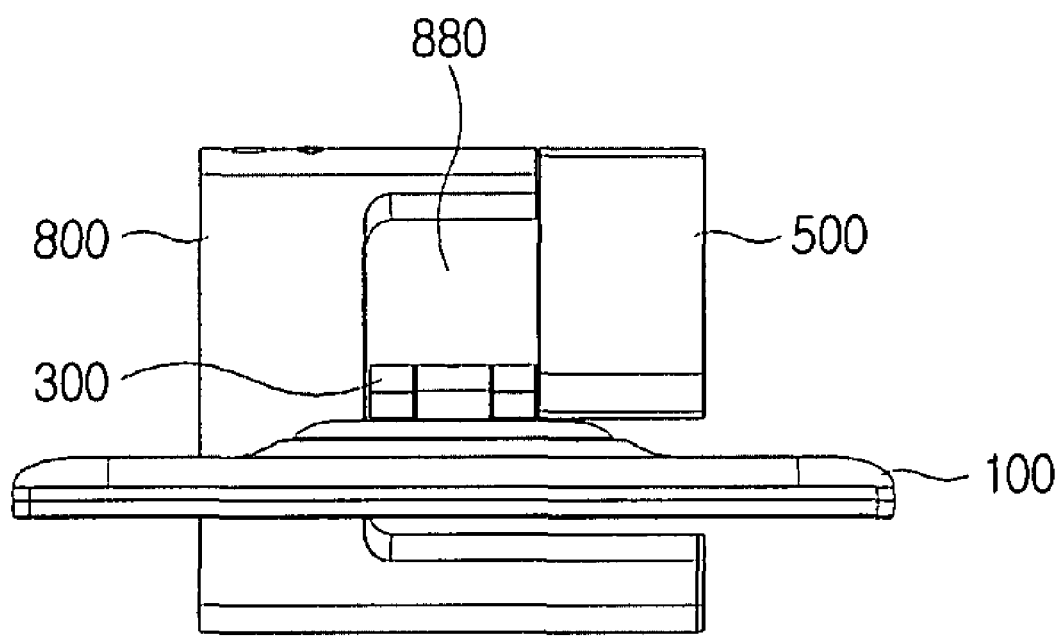

The upper link body 310 is provided with an upper cable guide 311 guiding a video signal cable 890 guided from the lower link 500 to the monitor main body 100. As shown in FIG. 4, the upper cable guide 311, which is formed to have a predetermined depth from a plate surface of the upper link body 310, accommodates the video signal cable 890. The upper cable guide 311 is provided with a cable supporting projection 311a supporting the video signal cable 890 so as to prevent separation of the accommodated video signal cable 890 during the movement of the upper link 300. A plurality of cable supporting projections 311a may be provided depending upon the length and the shape of the upper cable guide 311.

Figure 3:
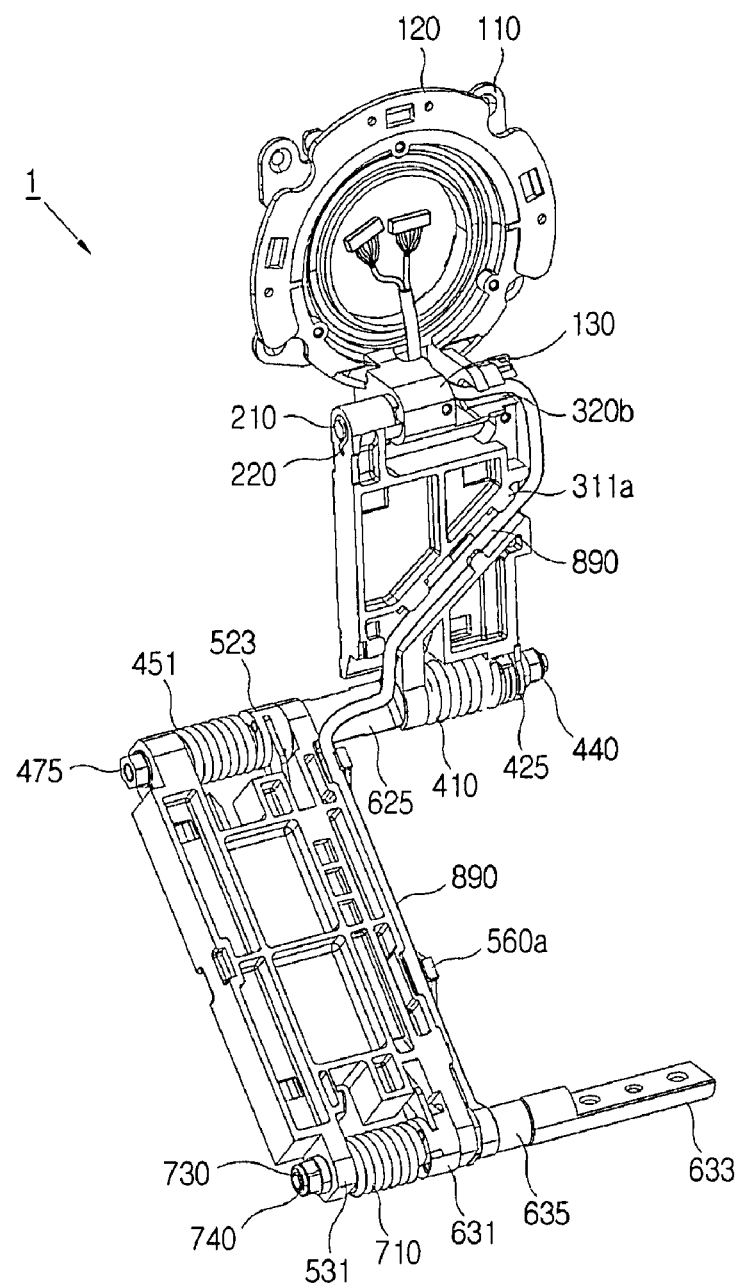
FIG. 3 is a connected perspective view illustrating a pivoting unit, an upper link and a lower link according to an exemplary embodiment of the present invention.

The upper cable guide 311 as shown in FIG. 3, may be provided in a diagonal shape crossing the upper link body 310, or in a lengthwise shape along a lengthwise direction of the upper link body 310. The upper cable guide 311 may form other shapes as well.

One side of at least one of the pair of monitor shaft supporting parts 320a and 320b may be cutout to easily accommodate the monitor shaft 210, and the monitor shaft 210 may be covered to monitor shaft covers 131, 330 by screws 331. The first middle hinge shaft supporting part 340 accommodates the first middle hinge shaft 623 of the first middle hinge 400. The first middle hinge shaft supporting part 340 is provided to be eccentrical toward the lower link 500.

Between the monitor shaft supporting parts 320a and 320b is provided a main body cable guide 320c guiding the video signal cable 890 guided by the upper cable guide 311 to the monitor main body 100. As shown in FIG. 3, the main body cable guide 320c enables the video signal cable 890 having passed by the upper link 300 to pass through the monitor shaft supporting parts 320a and 320b and to be connected to the monitor main body 100.

Preferably, the thickness d1 of the upper link 300 is the same as or smaller than that of a base main body 810 to maintain the same planar surface as the base main body 810 when folded and accommodated in the link accommodating part 880 of the base 800.

The lower link 500 of a rectangular plate shape is provided to be asymmetrically eccentrical to the upper link 300 provided in the center of the monitor main body 100, and is accommodated in the base 800 with the upper link 300 when the lower link 500 and the upper link 300 are folded. Lower parts 531 and 533 of the lower link 500 are tiltingly-connected with respect to the base hinge 700. Upper parts 521 and 523 are coupled to a second middle hinge shaft 621 having the same rotating axial line as the first hinge shaft 623 to which the lower part 340 of the upper link 300 is coupled, and upper parts 521 and 523 are disposed coaxially with the lower end part 340 of the upper link 300. Hence, the lower link 500 is provided to be adjacent to the upper link 300 and to be eccentrical with respect to the monitor main body 100, and can rotate between a folded state and a rotating state with respect to the rotating shaft 621 of the second middle hinge 450. The lower link 500 is accommodated in the link accommodating part 880 of the base 800 with the upper link 300 when the lower link 500 and the upper link 300 are folded.

The lower link 500 includes a lower link body 510, the second middle hinge shaft supporting parts 521 and 523 which are provided in the upper opposite sides of the lower link body 510 and accommodate and rotationally couple the second hinge shaft 621, the base hinge shaft supporting parts 531 and 533 which are provided on opposite sides of the lower part thereof and accommodate and rotationally couple a base hinge shaft 631, and a pair of lower link cover members 551 and 553 covering the lower link body 510.

As shown in FIG. 3, the lower link body 510 is provided with a lower cable guide 560 guiding the video signal cable 890 guided from the base part 800 to the upper link 300. The lower cable guide 560 is formed along the lengthwise on one side of the lower link body 510 and accommodates the video signal cable 890. Here, the lower cable guide 560 may be designed to have a shortest distance so that the length of the video signal cable 890 can be minimized to be connected to the monitor main body 100. Accordingly, the lower cable guide 560 may be provided diagonally crossing the lower link body 510 like the upper link 300, as necessary. The lower cable guide 560 is provided with a cable supporting projection 560a supporting the video signal cable 890.

Preferably, the thickness d2 of the lower link 500 is the same as or smaller than that of the base main body 810 to maintain the same planar surface as the base 800 when folded and accommodated in the link accommodating part 880 of the base 800.

As shown in FIG. 4, the auxiliary link 600 is coupled to the side of the lower link 500 and transmits the tilting of the lower link 600 with respect to the base 800 to the tilting of the upper link 300. The auxiliary link 600 disperses a repulsive force, which is generated when the lower link 500 is tilted to the second middle hinge 450 and the base hinge 700, thereby enabling a user to tilt easily. The auxiliary link 600 includes the first middle hinge shaft 623 accommodated in the first middle hinge shaft supporting part 340, the second hinge shaft 621 accommodated in the second middle hinge shafts supporting parts 521 and 523, the base shaft 631 accommodated in the base shaft supporting parts 531 and 533 of the lower link 600, a base main body shaft 633 accommodated in the base main body 810, and a coupling shaft 610 which couples the middle hinge shafts 621 and 623 to the base shafts 631 and 633 to transmit the tilting of the base hinge 700 to the middle hinges 400 and 450.

The first middle hinge shaft 623 is accommodated in the first middle hinge shaft supporting part 340 of the upper link 300, and the second middle hinge shaft 621 is accommodated in the second middle hinge shaft supporting parts 521 and 523 of the lower link 500. Preferably, the first middle hinge shaft 623 and the second middle hinge shaft 621 are integrally formed to easily transmit the tilting of the lower link 500 to the tilting of the upper link 300.

Also, between the first middle hinge shaft 623 and the second middle hinge shaft 621 is provided a separating part 625 for separating the first middle hinge shaft 623 from the second middle hinge shaft 621, so that the first middle hinge shaft 623 does not interfere with the second middle hinge shaft 621 when the first middle hinge shaft 623 and the second middle hinge shaft 621 rotate.

The base shaft 631 is accommodated in the base shaft supporting parts 531 and 533 of the lower link 500, and the base body shaft 633 is accommodated in the base main body 810. Preferably, the base shaft 631 and the base body shaft 633 are integrally formed, and a separating part 635 is provided between the base body shaft 633 and the base shaft 631.

The coupling shaft 610 transmits tilting of the base hinge 700 to the middle hinges 400 and 450 and enables tilting of the lower link 500 to be transmitted to the upper link 300. The coupling shaft 610 is provided along the lengthwise of the lower link 500.

The first middle hinge 400 controls the angle that monitor main body 100 rotates up and down by controlling the rotating angle of the upper link 300, transmits the rotating of the upper link 300 to the lower link and/or transmits the rotating of the lower link 500 to the upper link 300. That is, the first middle hinge 400 enables the upper link 300 to be in the folded state or the standing state by transmitting the rotating movement of the lower link 500 rotating between the folded and standing states to the rotating axis to the upper link 300.

The first middle hinge 400 includes the first middle hinge shaft 623 of the auxiliary link 600 inserted through the first middle hinge shaft supporting part 340 of the upper link 300, a torsion spring 410 accommodating the first middle hinge shaft 623 and having an elastic force biasing against the downward rotation of the monitor main body 100, hinge stoppers 415 and 420 supplying the torsion spring 410 with a friction force and having a predetermined projection to control the rotating angle, a tilting detent 425 limiting the rotating angle in the case that the upper link 300 goes beyond the predetermined angle, a side bracket 430 coupled to the side of the upper 400 and preventing separation of the above-described members, and a washer 435 and a nut 440 coupling the above-described members to the first middle hinge shaft 623.

The second middle hinge 450 transmits the rotating movement of the upper link 300 to the lower link 500 and/or transmits the movement of the lower link 500 rotating with respect to the base hinge 700 to the upper link 300. The second middle hinge 450 includes the second middle hinge shaft 621, a rotating shaft 460 accommodating the second middle hinge shaft 621, a torsion spring 451 accommodating the rotating shaft 460 to supply a friction force, a clip spring 465 accommodated in the second middle hinge shaft supporting part 521 and accommodate the second middle hinge shaft 621 inside to supply a friction force resisting the rotation of the second middle hinge shaft 621 and integrally rotating with the lower link 500, a washer 470 supplying a friction force, and a nut 475 coupled to the second middle hinge shaft 621.

The base hinge 700 includes the base hinge shaft 631 accommodated in the base hinge shaft supporting parts 531 and 533 of the lower link 500, a hinge shaft 720 accommodating the base hinge shaft 631, a torsion spring 710 accommodating the hinge shaft 720 and supplying a friction force in a direction of resisting the rotation of the hinge shaft 720, a stopper (not shown) controlling a rotating angle of the lower link 500, a washer 730 supplying a friction, and a nut 740.

Preferably, the rotating axis of the monitor hinge 700, the rotating axis of the middle hinge 400 and 450, and the rotating axis of the monitor hinge 700 are provided in parallel, so that they can be accommodated in parallel when the upper link 300 and the lower link 500 are folded.

Figure 2:
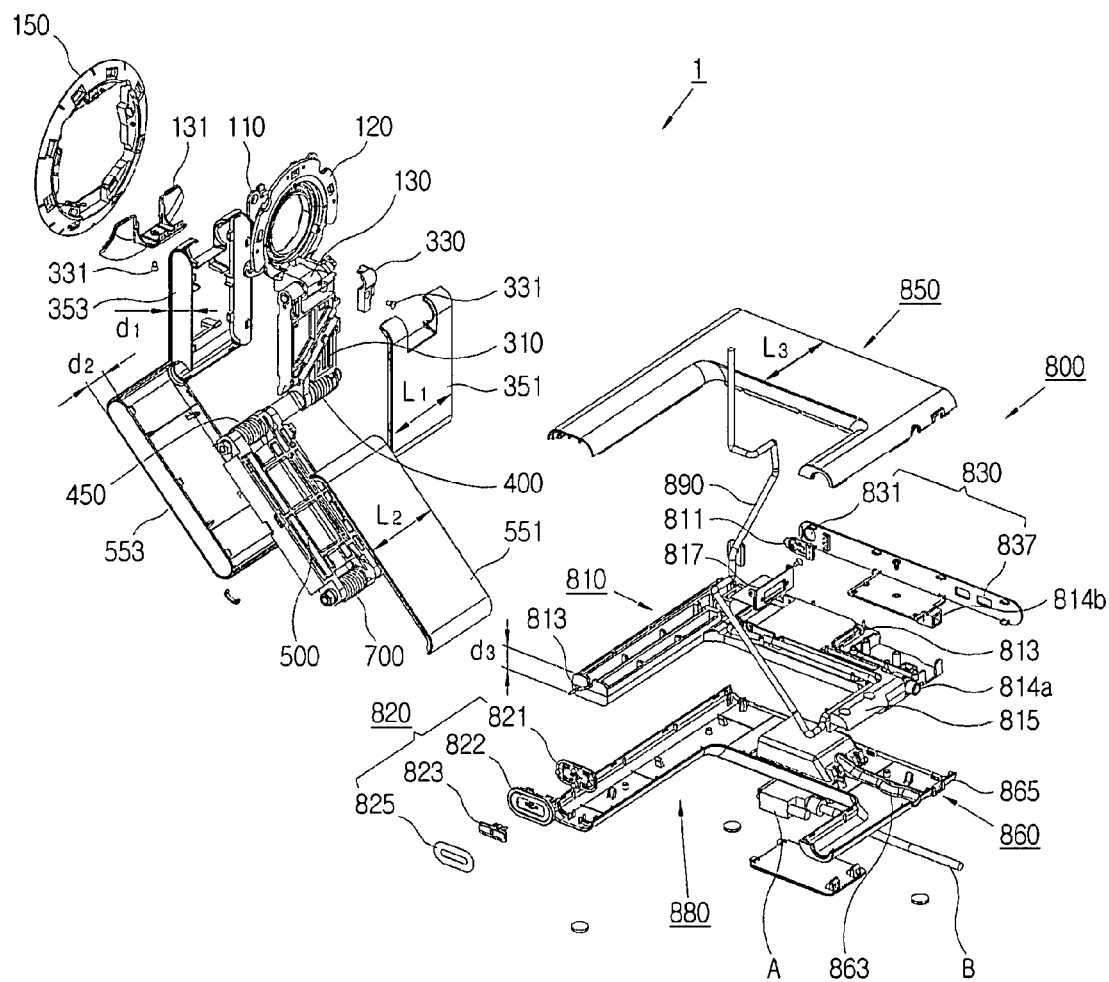
FIG. 2 is an exploded perspective view of a monitor apparatus according to an exemplary embodiment of the present invention.

The base 800, as shown in FIG. 2, includes the base main body 810, the link accommodating part 880 accommodating the upper link 300 and the lower link 500 simultaneously in the folded state, a base body shaft accommodating part 815 accommodating the base body shaft 633, a base body shaft accommodating part 815 accommodating a base body shaft 633, a pair of cover members 850 and 860 covering the base body 810, and a side cover 830 covering sides of the base main body 810.

The base 800 has a predetermined shape to comprise a closing space forming the base main body 810 and an opening space. The opening space is used as the link accommodating part 880 accommodating the upper link 300 and the lower link 500 when folded. The link accommodating part 880 has a shape corresponding to the shape of the upper link 300 and the lower link 500.

The base 800 according to an exemplary embodiment of the present invention is provided to have a rectangular shape. Preferably, the upper link 300, the lower link 500 and the base main body 810 have the same width so that the monitor main body 100 can be supported stably (L1=L2=L3 in FIG. 2). Alternatively, the base 800 may be provided with other shapes in place of a rectangular shape, and accordingly, the shapes of the upper link 300 and the lower link 500 may be changed variously.

The base main body 810 is provided in the shape of '' '⊏'' having the opening part. In one end part of the base main body 810 are provided power supplying ports 814*a* and USB port 814*b* to which a power supplying source or signal source of the outside is coupled, a power supplying part 820 which is supplied with power by a user, a power supplying cable 813 transmitting the power supplied from the power supplying source through the power supplying ports 814*a* to the power supplying part 820, and a control button 811 for displaying a display state of the monitor main body 100 on the display part 160 if the user wants.

An outside power supplying source is coupled to the power supplying port 814*a*. The power supplying port 814*a* may be provided in various shapes to correspond to the shape of a connector supplying power from the outside power supplying source. The power supplied through the power supplying port 814*a* is supplied to the power supplying part 820, and the control button 811 through the power supplying cable 813.

The power supplying part 820 is provided in one end part of one side in the front of the monitor apparatus 1. As shown in FIG. 2, the power supplying part 820 includes a power supplying button 823 which is provided to supply power when pushed by a user, a button accommodating part 822 accommodating the power supplying button 823 and having a lamp on an outer circumference thereof, a light emitting part 821 provided in the back area of the button accommodating part 822 to emit light, and a light emitting part cover 825 covering the outer circumference of the power supplying button 823.

Hence, when the power supplying button 823 is pushed by a user and power is supplied to the monitor main body 100, the light emitting part 821 emits light and the circumference part 825 around the power button emits light. Then, the user can determine whether the power is supplied or not, and in the case that different color of light from the cover member 850 is emitted, it looks beautiful. Here, at least one LED (light emitted diode) may be used for the light emitting part 821, or other emitting units may be used.

The image control button 811 allows to display a display state of the display part 160 on the display part 160 by a user's manipulation. In general, the display state is provided in the shape of GUI (graphic user interface) in the display part 160. Accordingly, the user can manipulate the image control button 811 and control a display state such as a right or left height, an up or down height, and brightness of the image part 160. Accordingly, the user can control the display state through one control button 811, thereby enhancing a user's convenience and achieving a compact appearance.

The side cover part 830 covers the side coupling the base main body 810 and the upper and the lower covers 850 and 860. In the side cover part 830 are provided a control button accommodating opening 831 provided corresponding to the control button 811 so that the user can manipulation the control button 811, and an exterior device connector 837 to which an exterior device is coupled.

The exterior device connector 837 is provided to directly mount devices such as portable storage media of which the use is greatly increasing recently, an MP3 player, and a digital camera without being connected with a computer main body. Accordingly, a user can approach easily the side of the computer main body. Here, the exterior device connector 837 may be provided as a USB (universal serial bus) port which is provided different type from the USB port 814*b*. Also, in the case that the USB port provided in the computer main body is less than desired, it may be easily complemented. Alternatively, if an exterior device is mounted through the exterior device connector 837, a firmware of the computer main body recognizes and displays the exterior device on the display part 160. The exterior device connector 837 may also be provided in the shape of a card reader to which a memory card such as a SD card (secure digital card), and a CF card (compact flash card) is mounted. The exterior device connector 837 may also be provided in the shape of a card reader to which a smart card is mounted.

The upper cover member 850 covers an upper part of the base main body 810 to have a simple appearance, and the lower cover member 860 includes a video signal connector accommodating part 861 accommodating a video signal connector A for supplying a video signal of the exterior device to the monitor main body 100.

The lower cover member 860 is formed from the bottom surface thereof. The lower cover member 860 includes a video signal connector accommodating part 861 accommodating the video signal connector A, a video signal connector coupling part 817 which is provided on one side of the video signal connector accommodating part 861 to be coupled to the video signal connector A, and a cable guide groove 863 accommodating the video signal cable B connected to the video signal connector A. The video signal connector A is connected with the exterior device such as a computer main body, a beam project, and a camcorder, generating a video signal to transmit the video signal to the monitor main body 100.

The lower cover member 860 accommodates the video signal connector A and the video signal cable B in the inside of the bottom surface by the video signal connector accommodating part 861 and the cable guide groove 863 formed to the bottom surface to be corresponding to the shape and the thickness of the video signal connector A and the video signal cable B. Hence, the video signal connector A and the video signal cable B are not exposed to the outside, thereby achieving a neat appearance, and preventing a height imbalance of the base part 800.

The video signal transmitted to the video signal connector coupling part 817 is transmitted to the monitor main body 100 along the video cable 890. The video cable 890 is connected to the monitor main body 100 along the lower cable guide 560 of the lower link 500, the upper cable guide 311 of the upper link 300, and the main body cable guide 320c.

An operation of the monitor apparatus 1 with this configuration according to the present will be described with reference to FIGS. 6A to 6C.

Figure 6A:
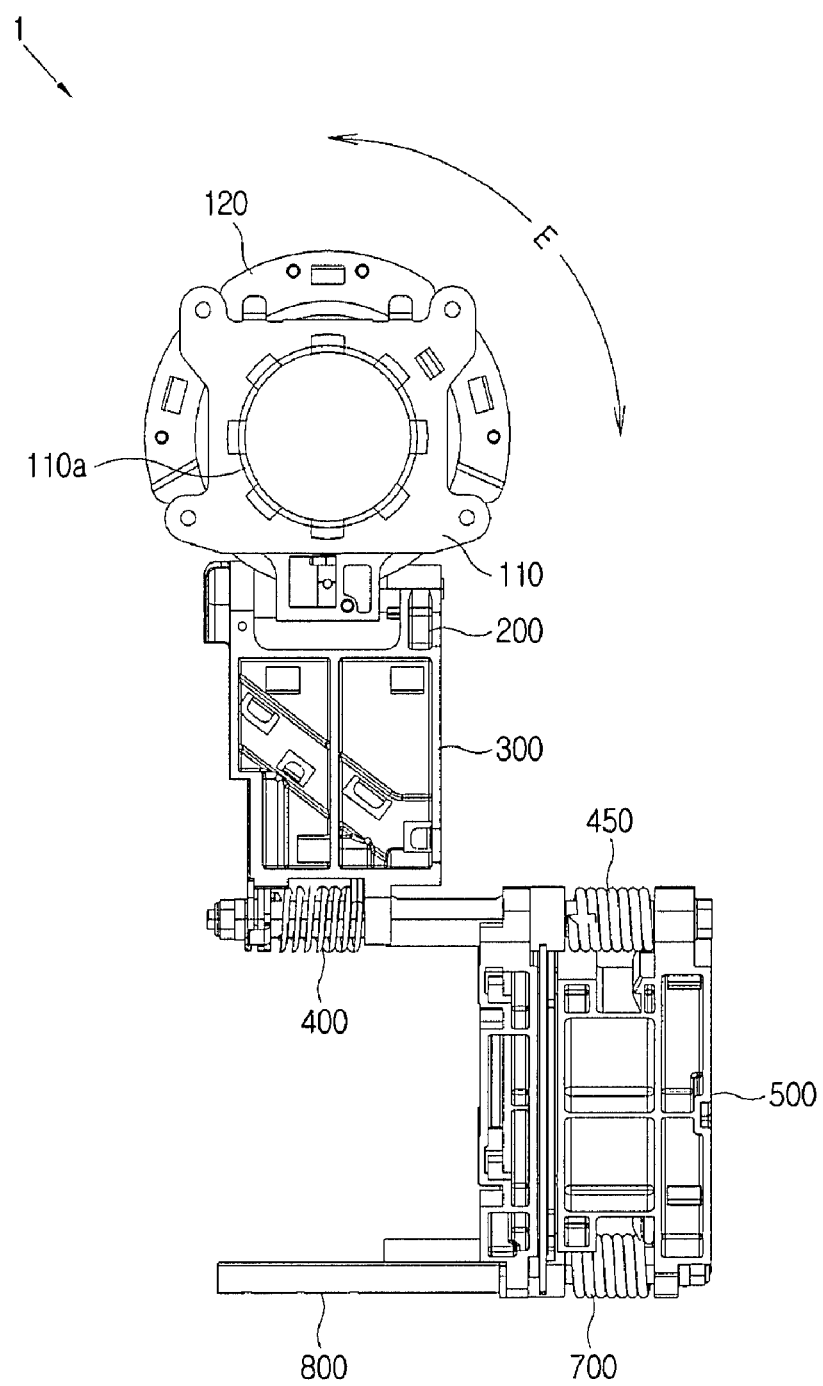
FIGS. 6A to 6C are views illustrating an operation of a monitor apparatus according to an exemplary embodiment of the present invention.
Figure 6B:
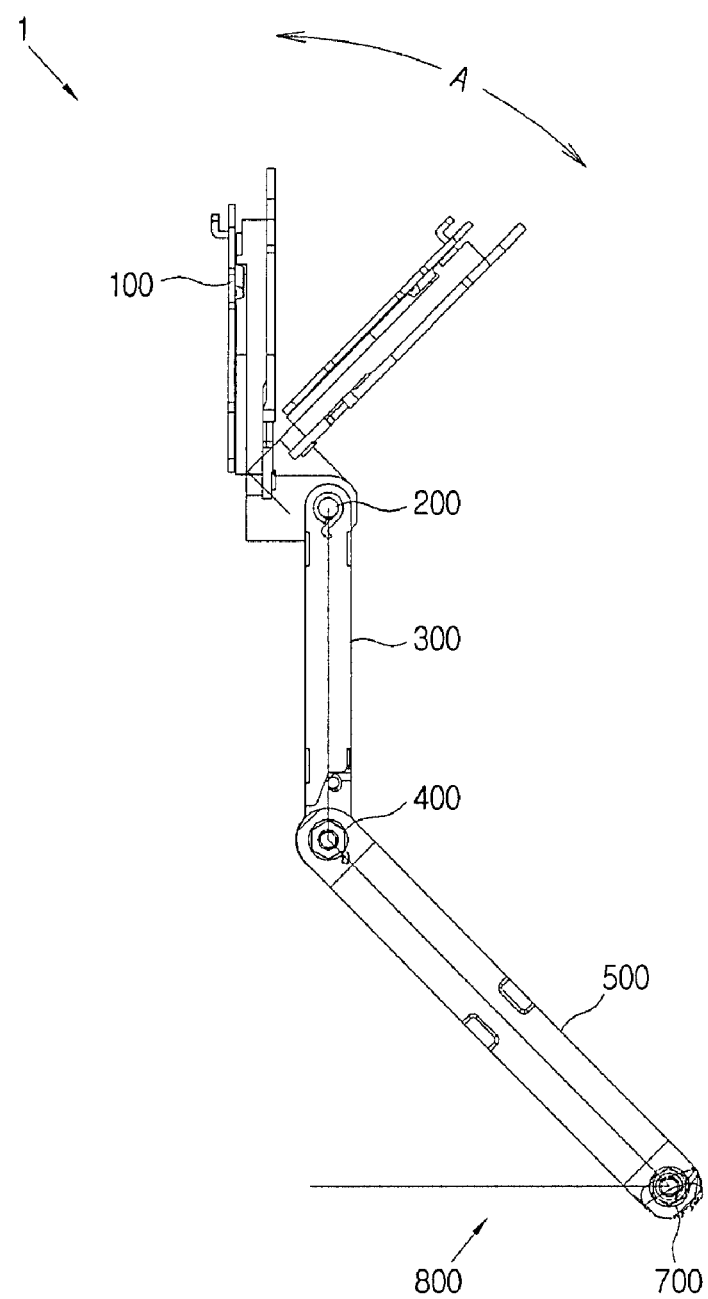

As shown in FIG. 6A, the monitor apparatus 1 according to an exemplary embodiment of the present invention can be pivoted rotating right and left with respect to the pivoting shaft 110a of the main body bracket 110 as shown in an arrow direction E. Also, the monitor main body 100 can be rotationally pivoted rotating back and forth with respect to the monitor hinge 200 as shown in arrow A of FIG. 6B, thereby controlling a viewing angle of the monitor main body 100.

Figure 6C:
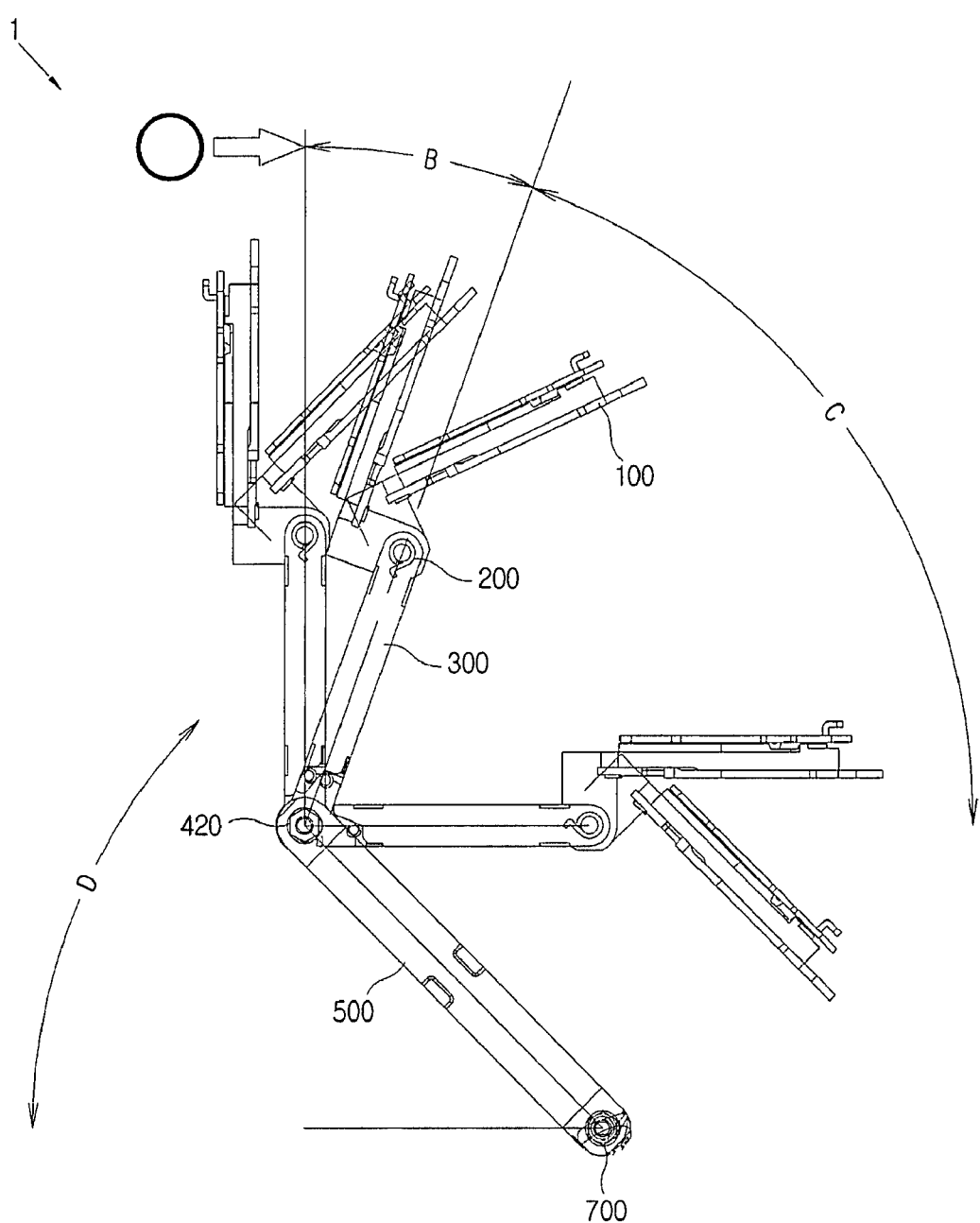

Also, as shown in FIG. 6C, the upper link 300 is rotated in an arrow direction C to be folded in parallel in the base member 800 with respect to the middle hinge 400, and the lower link 500 is folded rotating toward an opposite direction D to the rotation of the upper link 300 with respect to the base hinge 700.

Figure 7A:
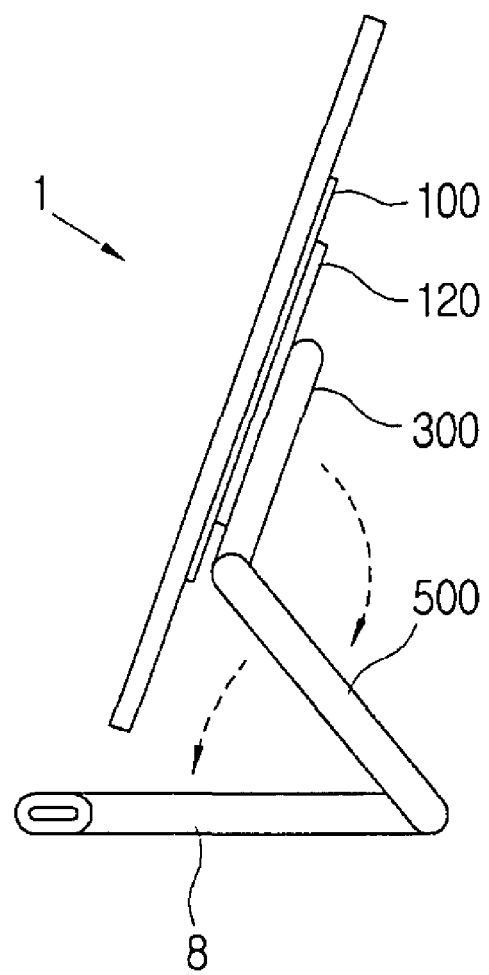
FIGS. 7A and 7B are views illustrating a folding operation of a monitor apparatus according to an exemplary embodiment of the present invention.
Figure 7B:
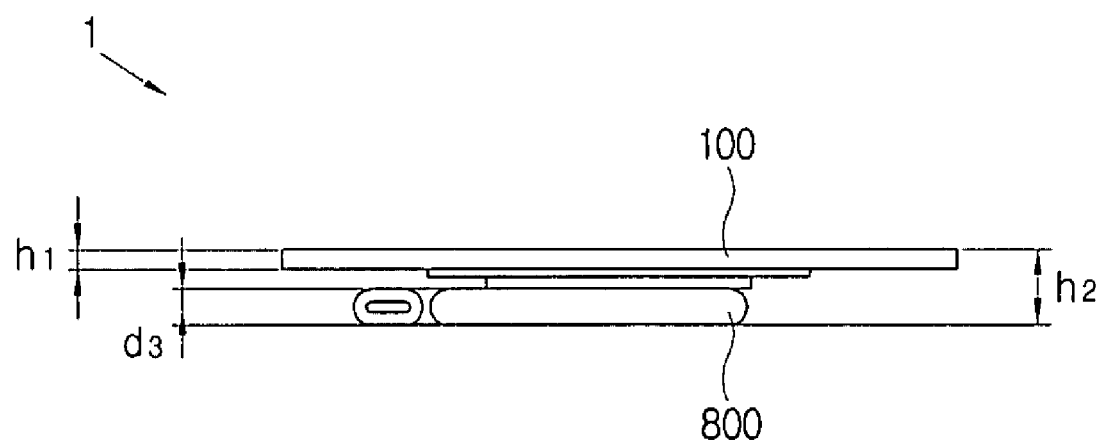

FIGS. 7A and 7B are sectional views illustrating a process that the upper link 300 and the lower link 500 of the monitor apparatus 1 according to an exemplary embodiment of the present invention are folded in order to be packed. As shown in FIG. 7A, when the monitor main body 100 is rotated in parallel to the upper link 300 through the monitor hinge 200, and the upper link 300 and the lower link 500 are rotated in the arrow direction, the upper link 300 and the lower link 500 are accommodated side by side in the opened link accommodating part 880 of the base 800 and are positioned in the same plane as the base 800, as shown in FIG. 7B. Accordingly, the whole thickness h2 of the monitor apparatus 1 decreases as much as the thickness of the link in comparison with conventional apparatuses and is the same as the sum of the thickness h1 of the monitor main body 100 and the thickness d3 of the base 800.

In the monitor apparatus according to an exemplary embodiment of the present invention, as described above, the monitor main body is rotationally provided by hinged-combining with the upper link, but may be applied to the case that it is upwardly/downwardly provided by slidingly-combining with the upper link or rotated in various ways by a ball hinge.

Figure 8:
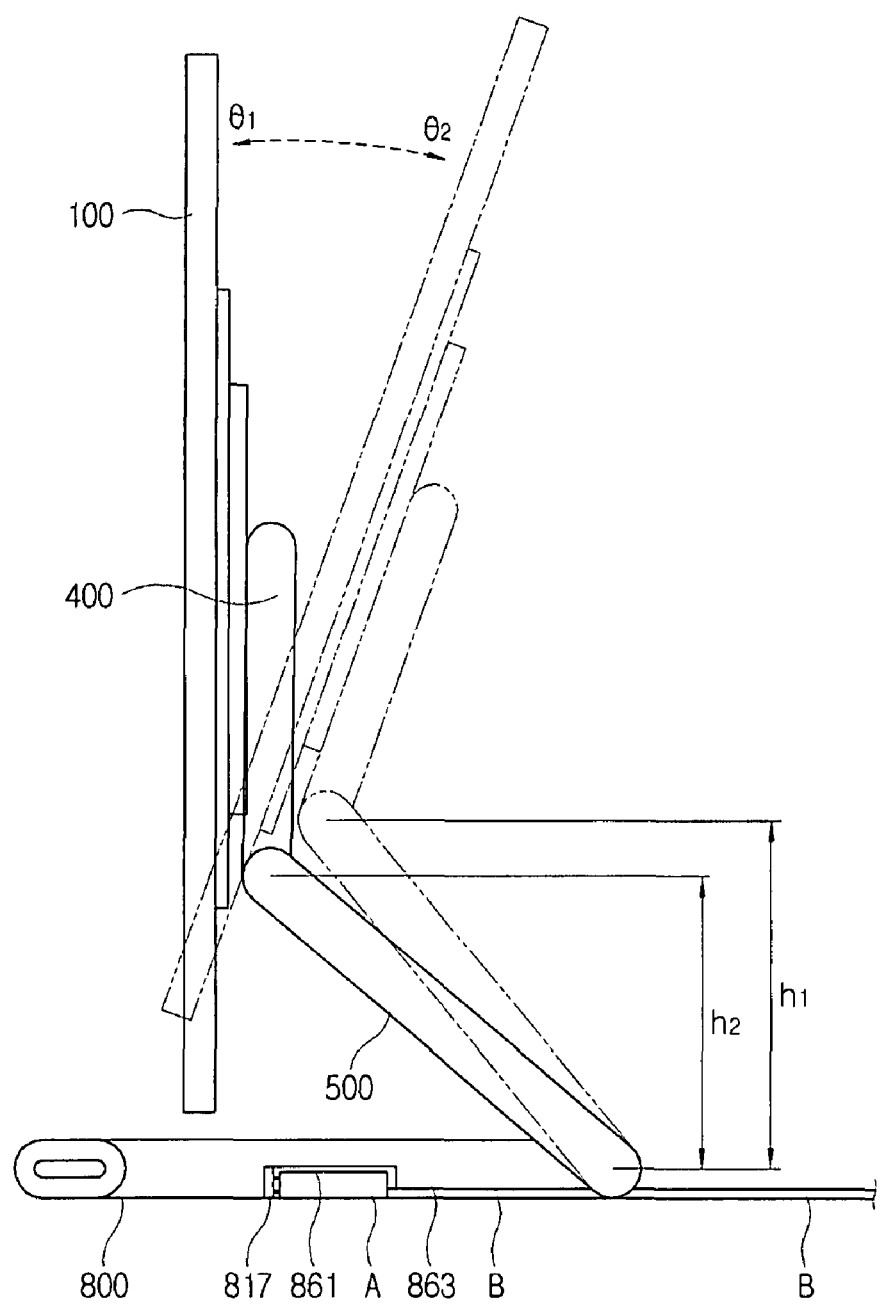
FIG. 8 is a sectional view illustrating an external cable connection structure of a monitor according to an exemplary embodiment of the present invention.

Meanwhile, as shown in FIG. 8, the monitor apparatus 1 according to an exemplary embodiment of the present invention includes a guide groove 863 and a video signal connector accommodating part 861 which are formed in a base 800 and accommodate a video signal cable B and a video signal connector A of an exterior device, respectively. The guide groove 863 and the video signal connector accommodating part 861 are recessed on a bottom surface of the base 800 while corresponding to the thickness of the video signal cable B and the video signal connector A, thereby accommodating them, respectively. As the guide groove 863 and the video signal connector accommodating part 861 are recessed on the bottom surface of the base 800, the video signal cable B and the video signal connector A are not exposed to the outside, the height of the base 800 becomes invariable and the outer appearance of the monitor apparatus is enhanced. At this time, the upper link 400 and the lower link 500 provided between the monitor main body 100 and the base main body 810 are adapted to adjust the angle ($\theta 1 \rightarrow \theta 2$) and the height (h1$\rightarrow$h2) of the monitor main body 100.

The foregoing base structure is applied to the case where the upper link 400 and the lower link 500 provided as a supporting member to support the monitor main body 100 are adapted to adjust the height and the angle of the monitor main body, but alternatively may be applied even though the supporting member is not adapted to adjust the height and the angle of the monitor main body 100. In other words, the video signal connector accommodating part 861 and the guide groove 863 may be recessed on the bottom surface of the base 800 regardless of whether the supporting member allows the monitor main body to be adjustable in its height and angle.

As described above, in the monitor apparatus according to an exemplary embodiment of the present invention, the upper link and the lower link are accommodated inside the base when folded, thereby minimizing the packaging volume.

Also, the LED lamps are provided around the power supplying button of the base to easily determine whether power is supplied or not. Further, the USB port is provided in the base to improve convenience for a user.

Also, the video signal connector and the video signal cable are accommodated in the base part, thereby obtaining a neat appearance.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. A monitor apparatus, comprising:
    a monitor main body;
    an upper link rotationally coupled to the monitor main body and having at least two sides;
    a lower link having at least two sides and rotationally coupled to the upper link at an end; and
    a base to which the lower link is rotationally coupled, the base comprising a link accommodating part adapted to accommodate the upper link and the lower link in a folded state, such that the lower link and the upper link are accommodated side by side in the link accommodating part, such that only one side of the upper link and only one side of the lower link are side by side in the folded state, and such that the upper link and the lower link are disposed in the same planar surface in the folded state.

2. The monitor apparatus according to claim 1, wherein the monitor main body and the upper link are rotationally coupled to each other along a monitor hinge axial line in parallel with a link axial line.

3. The monitor apparatus according to claim 1, wherein the base further comprises a power supplying port to which an exterior power supplying connector is coupled.

4. The monitor apparatus according to claim 3, wherein the base further comprises a power supplying button which is connected to the power supplying port through a power supplying cable and permits power to be supplied to the monitor main body.

5. The monitor apparatus according to claim 4, wherein the base further comprises a light emitting part provided on an outer circumference of the power supplying button and emitting light if power is supplied to the monitor main body.

6. The monitor apparatus according to claim 5, wherein the light emitting part comprises at least one light emitting diode (LED).

7. The monitor apparatus according to claim 1, wherein the base further comprises a video signal connector coupling part adapted for coupling to a video signal connector of an exterior device to transmit a video signal from the exterior device to the monitor main body through a video signal cable coupled to the video signal connector coupling part.

8. The monitor apparatus according to claim 7, wherein the base further comprises a video signal connector accommodating part which is recessed on a bottom of the base to accommodate the video signal connector of the exterior device for coupling the video signal connector to the video signal connector coupling part.

9. The monitor apparatus according to claim 8, wherein the base further comprises a cable guide groove which is extended from the video signal connector accommodating part to an end of the base to accommodate an external cable of the exterior device.

10. The monitor apparatus according to claim 7, further comprising a lower cable guide provided in the lower link and guiding the video signal cable to the upper link.

11. The monitor apparatus according to claim 10, further comprising an upper cable guide provided in the upper link and guiding the video signal cable guided from the lower link to the monitor main body.

12. The monitor apparatus according to claim 11, further comprising a main body cable guide which is formed through a coupled area of the upper link and the monitor main body and which guides the video signal cable to the monitor main body.

13. The monitor apparatus according to claim 7, further comprising a control button connected to the video signal connector in the base and provided at the base and controlling a display state of the monitor main body.

14. The monitor apparatus according to claim 1, wherein the upper link and the lower link in the folded state have the same height as the base.

15. The monitor apparatus according to claim 1, wherein the upper link and the lower link in the folded state have a height which is less than the height of the base.

16. The monitor apparatus according to claim 9, wherein the end of the bottom surface is an outer circumference of the bottom surface.

17. The monitor apparatus according to claim 1, wherein the upper link and the lower link in the folded state have the same height as the base.

18. The monitor apparatus according to claim 1, wherein the upper link and the lower link in the folded state have a height which is less than the height of the base.

\* \* \* \* \*

UNITED STATES PATENT AND TRADEMARK OFFICE
CERTIFICATE OF CORRECTION

PATENT NO. : 8,011,623 B2
APPLICATION NO. : 11/711763
DATED : September 6, 2011
INVENTOR(S) : Kwang-sung Hwang et al.

It is certified that error appears in the above-identified patent and that said Letters Patent is hereby corrected as shown below:

Column 12, Line 33, In Claim 1, delete "haying" and insert -- having --, therefor.

Signed and Sealed this
Thirty-first Day of January, 2012

David J. Kappos
*Director of the United States Patent and Trademark Office*